US012243540B2

(12) United States Patent
Laitinen et al.

(10) Patent No.: US 12,243,540 B2
(45) Date of Patent: Mar. 4, 2025

(54) MERGING OF SPATIAL AUDIO PARAMETERS

(71) Applicant: Nokia Technologies Oy, Espoo (FI)

(72) Inventors: Mikko-Ville Laitinen, Espoo (FI); Lasse Laaksonen, Tampere (FI); Adriana Vasilache, Tampere (FI); Tapani Pihlajakuja, Kellokoski (FI); Anssi Rämö, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 294 days.

(21) Appl. No.: 17/786,088

(22) PCT Filed: Nov. 13, 2020

(86) PCT No.: PCT/FI2020/050750
§ 371 (c)(1),
(2) Date: Jun. 16, 2022

(87) PCT Pub. No.: WO2021/130404
PCT Pub. Date: Jul. 1, 2021

(65) Prior Publication Data

US 2023/0197086 A1 Jun. 22, 2023

(30) Foreign Application Priority Data

Dec. 23, 2019 (GB) ..................................... 1919130

(51) Int. Cl.
*G10L 19/008* (2013.01)
*H04S 7/00* (2006.01)

(52) U.S. Cl.
CPC ............ *G10L 19/008* (2013.01); *H04S 7/302* (2013.01); *H04S 2420/03* (2013.01)

(58) Field of Classification Search
CPC ................................ G10L 19/008; H04S 7/302
(Continued)

(56) References Cited

U.S. PATENT DOCUMENTS 9,489,955 B2 11/2016 Peters et al.
2009/0234657 A1* 9/2009 Takagi .................. G10L 19/008
704/500

(Continued)

FOREIGN PATENT DOCUMENTS

EP 2600343 A1 6/2013
GB 2574238 A 12/2019
(Continued)

OTHER PUBLICATIONS

B. Wu and L. Gao, "Downmix and coding of multichannel signals based on spatial correlation," 2015 8th International Congress on Image and Signal Processing (CISP), Shenyang, China, 2015, pp. 1142-1146, doi: 10.1109/CISP.2015.7408052. keywords: {Correlation; Transform coding;Three-dimensional displays; (Year: 2015).*

(Continued)

*Primary Examiner* — Bharatkumar S Shah
(74) *Attorney, Agent, or Firm* — ALSTON & BIRD LLP

(57) ABSTRACT

There is inter alia disclosed an apparatus for spatial audio encoding comprising: means for determining at least two of a type of spatial audio parameter for one or more audio signals, wherein a first of the type of spatial audio parameter is associated with a first group of samples in a domain of the one or more audio signals and a second of the type of spatial audio parameter is associated with a second group of samples in the domain of the one or more audio signals; and means for merging the first of the type of spatial audio parameter and the second of the type of spatial audio parameter into a merged spatial audio parameter.

20 Claims, 4 Drawing Sheets

(58) Field of Classification Search
USPC .......................................................... 704/500
See application file for complete search history.

(56) References Cited

U.S. PATENT DOCUMENTS

| | | | | |
|---|---|---|---|---|
| 2012/0314877 | A1 | 12/2012 | Ojala | |
| 2013/0177887 | A1* | 7/2013 | Hoehne ................ | G09B 23/283 434/263 |
| 2014/0025386 | A1 | 1/2014 | Xiang et al. | |
| 2014/0297296 | A1* | 10/2014 | Koppens ............... | G10L 19/008 704/500 |
| 2015/0170657 | A1* | 6/2015 | Thompson ............ | G10L 19/008 704/500 |
| 2016/0078877 | A1 | 3/2016 | Vasilache et al. | |

FOREIGN PATENT DOCUMENTS

| | | | |
|---|---|---|---|
| WO | 2014/099285 | A1 | 6/2014 |
| WO | 2014/187991 | A1 | 11/2014 |
| WO | 2016/133785 | A1 | 8/2016 |
| WO | 2017/005978 | A1 | 1/2017 |
| WO | 2018/091776 | A1 | 5/2018 |
| WO | 2019/086757 | A1 | 5/2019 |
| WO | 2019/097018 | A1 | 5/2019 |
| WO | 2019/234290 | A1 | 12/2019 |
| WO | 2020/008105 | A1 | 1/2020 |
| WO | 2020/070377 | A1 | 4/2020 |
| WO | 2020/089510 | A1 | 5/2020 |
| WO | 2020/193865 | A1 | 10/2020 |
| WO | 2021/048468 | A1 | 3/2021 |

OTHER PUBLICATIONS

B. Wu and L. Gao, "Downmix and coding of multichannel signals based on spatial correlation," 2015 8th International Congress on Image and Signal Processing (CISP), Shenyang, China, 2015, pp. 1142-1146, doi: 10.1109/CISP.2015.7408052. keywords: {Correlation; Transform coding; Three-dimensional displa (Year: 2015).*

J. Capobianco, G. Pallone and L. Daudet, "Dynamic strategy for window splitting, parameters estimation and interpolation in spatial parametric audio coders," 2012 IEEE International Conference on Acoustics, Speech and Signal Processing (ICASSP), Kyoto, Japan, 2012, pp. 397-400, doi: 10.1109/ICASSP.2 ( (Year: 2012).*

Extended European Search Report received for corresponding European Patent Application No. 20907123.2, dated Dec. 1, 18, 2023, 10 pages.

Office action received for corresponding Indian Patent Application No. 202247041316, dated Oct. 18, 2022, 5 pages.

"Proposal for MASA common metadata and metadata structure", 3GPP TSG-SA4#101 meeting, S4-181353, Agenda: 7.5, Nokia Corporation, Nov. 19-23, 2018, pp. 1-4.

Search Report received for corresponding United Kingdom Patent Application No. 1919130.3, dated Jun. 18, 2020, 5 pages.

International Search Report and Written Opinion received for corresponding Patent Cooperation Treaty Application No. PCT/FI2020/050750, dated Feb. 23, 2021, 15 pages.

Tsingos et al., "Perceptual audio rendering of complex virtual environments", ACM Transactions on Graphics, vol. 23, No. 3, Aug. 2004, pp. 249-258.

Yang et al., "Multi-channel Object-Based Spatial Parameter Compression Approach for 3D Audio", Advances in Multimedia Information Processing, 2015, pp. 354-364.

Kazakova et al., "Iterative weighted 2D orientation averaging that minimizes arc-length between vectors", IEEE/RSJ International Conference on Intelligent Robots and Systems (IROS), Sep. 24-28, 2017, pp. 2499-2504.

"Proposal for MASA format", 3GPP TSG-SA4#102 meeting, S4-190121, Agenda: 7.5, Nokia Corporation, Jan. 28-Feb. 1, 2019, pp. 1-10.

* cited by examiner

MERGING OF SPATIAL AUDIO PARAMETERS

RELATED APPLICATION

This application was originally filed as PCT Application No. PCT/FI2020/050750, filed on Nov. 13, 2020, which claims priority from GB Application No. 1919130.3, filed on Dec. 23, 2019, each of which is incorporated herein by reference in its entirety.

FIELD

The present application relates to apparatus and methods for sound-field related parameter encoding, but not exclusively for time-frequency domain direction related parameter encoding for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total energy ratios in frequency bands are thus a parameterization that is particularly effective for spatial audio capture.

A parameter set consisting of a direction parameter in frequency bands and an energy ratio parameter in frequency bands (indicating the directionality of the sound) can be also utilized as the spatial metadata (which may also include other parameters such as surround coherence, spread coherence, number of directions, distance, etc.) for an audio codec. For example, these parameters can be estimated from microphone-array captured audio signals, and for example a stereo or mono signal can be generated from the microphone array signals to be conveyed with the spatial metadata. The stereo signal could be encoded, for example, with an AAC encoder and the mono signal could be encoded with an EVS encoder. A decoder can decode the audio signals into PCM signals and process the sound in frequency bands (using the spatial metadata) to obtain the spatial output, for example a binaural output.

The aforementioned solution is particularly suitable for encoding captured spatial sound from microphone arrays (e.g., in mobile phones, VR cameras, stand-alone microphone arrays). However, it may be desirable for such an encoder to have also other input types than microphone-array captured signals, for example, loudspeaker signals, audio object signals, or Ambisonic signals.

Analysing first-order Ambisonics (FOA) inputs for spatial metadata extraction has been thoroughly documented in scientific literature related to Directional Audio Coding (DirAC) and Harmonic planewave expansion (Harpex). This is since there exist microphone arrays directly providing a FOA signal (more accurately: its variant, the B-format signal), and analysing such an input has thus been a point of study in the field. Furthermore, the analysis of higher-order Ambisonics (HOA) input for multi-direction spatial metadata extraction has also been documented in the scientific literature related to higher-order directional audio coding (HO-DirAC).

A further input for the encoder is also multi-channel loudspeaker input, such as 5.1 or 7.1 channel surround inputs and audio objects.

However, with respect to the components of the spatial metadata the compression and encoding of the spatial audio parameters is of considerable interest in order to minimise the overall number of bits required to represent the spatial audio parameters.

SUMMARY

There is provided according to a first aspect an apparatus for spatial audio encoding comprising: means for determining at least two of a type of spatial audio parameter for one or more audio signals, wherein a first of the type of spatial audio parameter is associated with a first group of samples in a domain of the one or more audio signals and a second of the type of spatial audio parameter is associated with a second group of samples in the domain of the one or more audio signals; and means for merging the first of the type of spatial audio parameter and the second of the type of spatial audio parameter into a merged spatial audio parameter.

The apparatus may further comprise means for determining whether the merged spatial audio parameter is encoded for storage and/or transmission or whether the at least two of the type of spatial audio parameter is encoded for storage and/or transmission.

The apparatus may further comprise means for determining a metric for the first group of samples and the second group of samples; means for comparing the metric against a threshold value, wherein the apparatus further comprising the means for determining whether the merged spatial audio parameter is encoded for storage and/or transmission or whether the at least two of the type of spatial audio parameter is encoded for storage and/or transmission comprises: means for determining that when the metric is above the threshold value then determining that the at least two of the type of spatial audio parameter is encoded for storage and/or transmission; and means for determining that when the metric is below or equal to the threshold value then determining that the merged spatial audio parameter band is encoded for storage and/or transmission.

Alternatively, the apparatus may further comprise: means for determining a metric for the first group of samples and the second group of samples; means for determining a further at least two of a type of spatial audio parameter for one or more audio signals, wherein a further first of the type of spatial audio parameter is associated with a first further group of samples in a domain of the one or more audio signals and a further second of the type of spatial audio parameter is associated with a second further group of samples in the domain of the one or more audio signals; means for merging the further first of the type of spatial audio parameter and the further second of the type of spatial audio parameter into a further merged spatial audio parameter; means for determining a metric for the first further group of samples and second further group of samples; and means for determining that the further first of the type of spatial audio parameter and the further second of the type of spatial audio parameter are encoded for storage and/or transmission and the merged spatial audio parameter is encoded for storage and/or transmission when the metric for the first further group of samples and second further group of samples is higher than the metric for the first group of samples and the second group of samples.

The apparatus may further comprise means for determining an energy of the first group of samples of the one or more audio signals and an energy of the second group of samples of the one or more audio signals, wherein the value of the merged spatial audio parameter is dependent on the energy of the first group of samples of the one or more audio signals and an energy of the second group of samples of the one or more audio signals.

The type of spatial audio parameter may comprise a spherical direction vector and wherein the merged spatial audio parameter comprises a merged spherical direction vector, and wherein the means for merging the first of the type of spatial audio parameter and the second of the type of spatial audio parameter into a merged spatial audio parameter may comprise: means for converting the first spherical direction vector into a first cartesian vector converting the second spherical direction vector into a second cartesian vector, wherein the first cartesian direction vector and second cartesian direction vector each comprise an x-axis component, y-axis component and a z-axis component, wherein for each single component in turn the apparatus comprises; means for weighting the component of the first cartesian vector by the energy of the first group of samples of the one or more audio signals and a direct to total energy ratio calculated for the first group of samples of the one or more audio signals; means for weighting the component of the second cartesian vector by the energy of the second group of samples of the one or more audio signals and a direct to total energy ratio calculated for the second group of samples of the one or more audio signals; and means for summing, the weighted component of the first cartesian vector and the weighted respective component of the second cartesian vector to give a merged respective cartesian component vector; means for converting the merged cartesian x-axis component value, the merged cartesian y-axis component value and the merged cartesian z-axis component value into the merged spherical direction vector.

The apparatus may further comprise means for merging the direct to total energy ratio for the first group of samples of the one or more audio signals and the direct to total energy ratio of the second group of samples of the one or more audio signals into a merged direct to total energy ratio by determining the length of the merged cartesian vector and normalising the length of the merged cartesian vector by the sum of the energy of the first group of samples of the one or more audio signals and the energy of the second group of the one or more audio signals.

The apparatus may further comprise: means for determining a first spread coherence parameter associated with the first group of samples in the domain of the one or more audio signals and a second spread coherence parameter associated with the second group of samples in the domain of the one or more audio signals; and means for merging the first spread coherence parameter and the second spread coherence parameter into a merged spread coherence parameter.

The means for merging the first spread coherence parameter and the second spread coherence parameter into a merged spread coherence parameter may comprise: means for weighting a first spread coherence value by the energy of the first group of samples of the one or more audio signals; means for weighting a second spread coherence value by the energy of the second group of samples of the one or more audio; means for summing the weighted first spread coherence value and the weighted second spread coherence value to give a merged spread coherence value; and means for normalising the merged spread coherence value by the sum of the energy of the first group of samples of the one or more audio signals and the energy of the second group of the one or more audio signals.

The apparatus may further comprise: means for determining a first surround coherence parameter associated with the first group of samples in the domain of the one or more audio signals and a second surround coherence parameter associated with the second group of samples in the domain of the one or more audio signals; and means for merging the first surround coherence parameter and the second surround coherence parameter into a merged surround coherence parameter.

The means for merging the first surround coherence parameter and the second surround coherence parameter into a merged surround coherence parameter may comprise: means for weighting the first surround coherence value by the energy of the first group of samples of the one or more audio signals; means for weighting the second surround coherence value by the energy of the second group of samples of the one or more audio; means for summing, the weighted first surround coherence value and the weighted second surround coherence value to give the merged spread coherence value; and means for normalising the merged surround coherence value by the sum of the energy of the first group of samples of the one or more audio signals and the energy of the second group of the one or more audio signals.

The means for determining a metric may comprise: means for determining a sum of the length of the first cartesian vector and the length of the second cartesian vector; and means for determining a difference between the length of the merged cartesian vector and the sum.

The first group of samples may be a first subframe in the time domain and the second group of samples may be a second subframe in the time domain.

Alternatively, the first group of samples may be a first sub band in the frequency domain and the second group of samples may be a second sub band in the frequency domain.

According to a second aspect there is a method for spatial audio encoding comprising: determining at least two of a type of spatial audio parameter for one or more audio signals, wherein a first of the type of spatial audio parameter is associated with a first group of samples in a domain of the one or more audio signals and a second of the type of spatial audio parameter is associated with a second group of samples in the domain of the one or more audio signals; and merging the first of the type of spatial audio parameter and the second of the type of spatial audio parameter into a merged spatial audio parameter.

The method may further comprise determining whether the merged spatial audio parameter is encoded for storage and/or transmission or whether the at least two of the type of spatial audio parameter is encoded for storage and/or transmission.

The method may further comprise: determining a metric for the first group of samples and the second group of samples; comparing the metric against a threshold value, wherein the apparatus further comprising the means for determining whether the merged spatial audio parameter is encoded for storage and/or transmission or whether the at least two of the type of spatial audio parameter is encoded for storage and/or transmission comprises: determining that when the metric is above the threshold value then determining that the at least two of the type of spatial audio parameter is encoded for storage and/or transmission; and determining that when the metric is below or equal to the threshold value then determining that the merged spatial audio parameter band is encoded for storage and/or transmission.

Alternatively, the method may further comprise: determining a metric for the first group of samples and the second group of samples; determining a further at least two of a type of spatial audio parameter for one or more audio signals, wherein a further first of the type of spatial audio parameter is associated with a first further group of samples in a domain of the one or more audio signals and a further second of the type of spatial audio parameter is associated with a second further group of samples in the domain of the one or more audio signals; merging the further first of the type of spatial audio parameter and the further second of the type of spatial audio parameter into a further merged spatial audio parameter; determining a metric for the first further group of samples and second further group of samples; and determining that the further first of the type of spatial audio parameter and the further second of the type of spatial audio parameter are encoded for storage and/or transmission and the merged spatial audio parameter is encoded for storage and/or transmission when the metric for the first further group of samples and second further group of samples is higher than the metric for the first group of samples and the second group of samples.

The method may further comprise determining an energy of the first group of samples of the one or more audio signals and an energy of the second group of samples of the one or more audio signals, wherein the value of the merged spatial audio parameter is dependent on the energy of the first group of samples of the one or more audio signals and an energy of the second group of samples of the one or more audio signals.

The type of spatial audio parameter may comprise a spherical direction vector and wherein the merged spatial audio parameter may comprise a merged spherical direction vector, and wherein merging the first of the type of spatial audio parameter and the second of the type of spatial audio parameter into a merged spatial audio parameter may comprise: converting the first spherical direction vector into a first cartesian vector converting the second spherical direction vector into a second cartesian vector, wherein the first cartesian direction vector and second cartesian direction vector each comprise an x-axis component, y-axis component and a z-axis component, wherein for each single component in turn the apparatus comprises; weighting the component of the first cartesian vector by the energy of the first group of samples of the one or more audio signals and a direct to total energy ratio calculated for the first group of samples of the one or more audio signals; weighting the component of the second cartesian vector by the energy of the second group of samples of the one or more audio signals and a direct to total energy ratio calculated for the second group of samples of the one or more audio signals; and summing, the weighted component of the first cartesian vector and the weighted respective component of the second cartesian vector to give a merged respective cartesian component vector; converting the merged cartesian x-axis component value, the merged cartesian y-axis component value and the merged cartesian z-axis component value into the merged spherical direction vector.

The method may further comprise merging the direct to total energy ratio for the first group of samples of the one or more audio signals and the direct to total energy ratio of the second group of samples of the one or more audio signals into a merged direct to total energy ratio by determining the length of the merged cartesian vector and normalising the length of the merged cartesian vector by the sum of the energy of the first group of samples of the one or more audio signals and the energy of the second group of the one or more audio signals.

The method may further comprise: determining a first spread coherence parameter associated with the first group of samples in the domain of the one or more audio signals and a second spread coherence parameter associated with the second group of samples in the domain of the one or more audio signals; and merging the first spread coherence parameter and the second spread coherence parameter into a merged spread coherence parameter.

The merging the first spread coherence parameter and the second spread coherence parameter into a merged spread coherence parameter may comprise: weighting a first spread coherence value by the energy of the first group of samples of the one or more audio signals; weighting a second spread coherence value by the energy of the second group of samples of the one or more audio; summing the weighted first spread coherence value and the weighted second spread coherence value to give a merged spread coherence value; and normalising the merged spread coherence value by the sum of the energy of the first group of samples of the one or more audio signals and the energy of the second group of the one or more audio signals.

The method may further comprise: determining a first surround coherence parameter associated with the first group of samples in the domain of the one or more audio signals and a second surround coherence parameter associated with the second group of samples in the domain of the one or more audio signals; and merging the first surround coherence parameter and the second surround coherence parameter into a merged surround coherence parameter.

The merging the first surround coherence parameter and the second surround coherence parameter into a merged surround coherence parameter may comprise: weighting the first surround coherence value by the energy of the first group of samples of the one or more audio signals; weighting the second surround coherence value by the energy of the second group of samples of the one or more audio; summing, the weighted first surround coherence value and the weighted second surround coherence value to give the merged spread coherence value; and normalising the merged surround coherence value by the sum of the energy of the first group of samples of the one or more audio signals and the energy of the second group of the one or more audio signals.

Determining a metric may comprise: determining a sum of the length of the first cartesian vector and the length of the second cartesian vector; and determining a difference between the length of the merged cartesian vector and the sum.

The first group of samples may be a first subframe in the time domain and the second group of samples may be a second subframe in the time domain.

Alternatively, the first group of samples may be a first sub band in the frequency domain and the second group of samples may be a second sub band in the frequency domain.

According to a third aspect there is an apparatus for spatial audio encoding comprising at least one processor and at least one memory including computer program code, the at least one memory and the computer program code configured to, with the at least one processor, cause the apparatus to at least to determine at least two of a type of spatial audio parameter for one or more audio signals, wherein a first of the type of spatial audio parameter is associated with a first group of samples in a domain of the one or more audio signals and a second of the type of spatial audio parameter is associated with a second group of samples in the domain of the one or more audio signals; and merge the first of the type of spatial audio parameter and the second of the type of spatial audio parameter into a merged spatial audio parameter.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
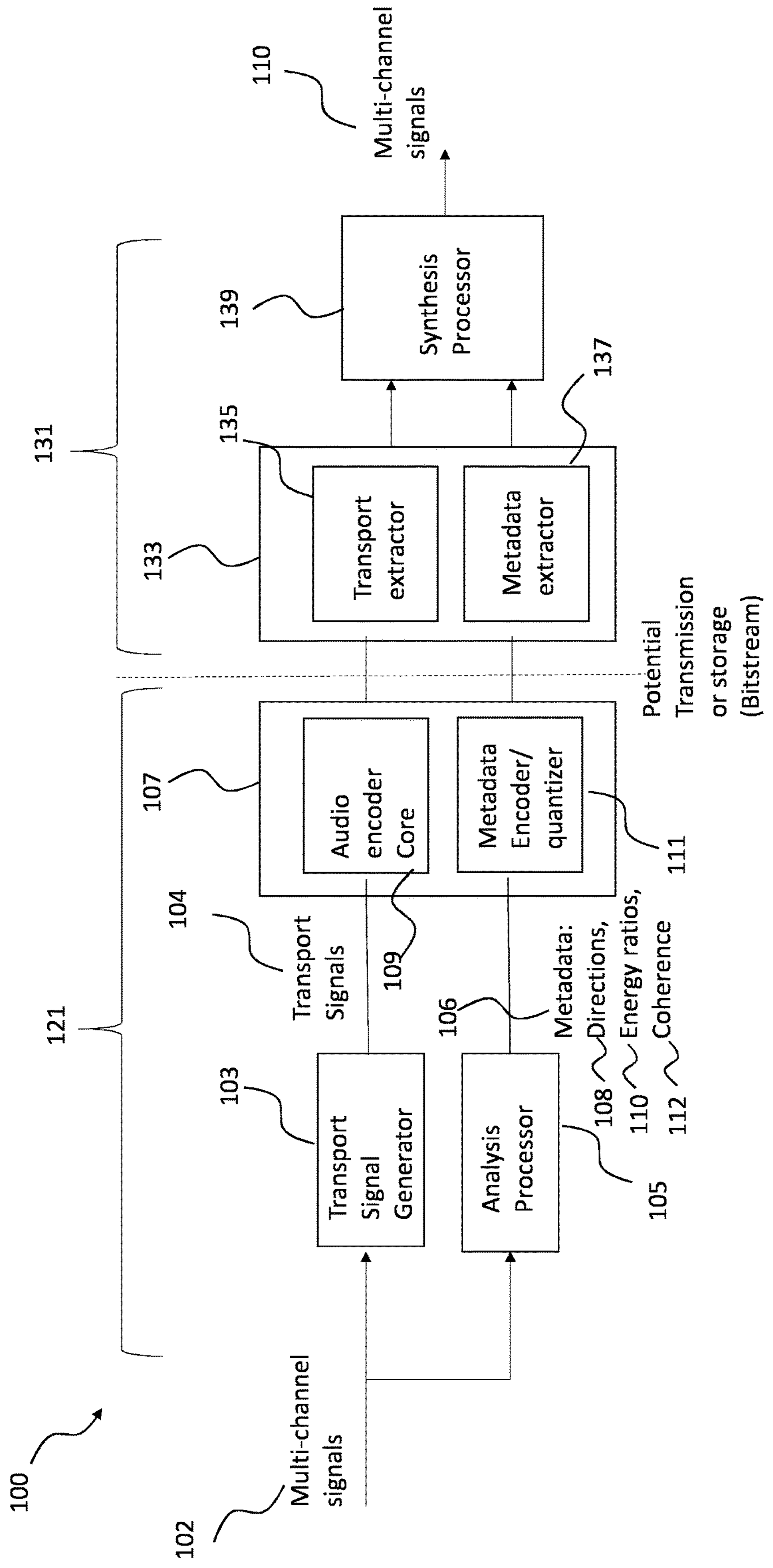
FIG. 1 shows schematically a system of apparatus suitable for implementing some embodiments.

The following describes in further detail suitable apparatus and possible mechanisms for the provision of effective spatial analysis derived metadata parameters. In the following discussions multi-channel system is discussed with respect to a multi-channel microphone implementation. However as discussed above the input format may be any suitable input format, such as multi-channel loudspeaker, ambisonic (FOA/HOA) etc. It is understood that in some embodiments the channel location is based on a location of the microphone or is a virtual location or direction. Furthermore, the output of the example system is a multi-channel loudspeaker arrangement. However, it is understood that the output may be rendered to the user via means other than loudspeakers. Furthermore, the multi-channel loudspeaker signals may be generalised to be two or more playback audio signals. Such a system is currently being standardised by the 3GPP standardization body as the Immersive Voice and Audio Service (IVAS). IVAS is intended to be an extension to the existing 3GPP Enhanced Voice Service (EVS) codec in order to facilitate immersive voice and audio services over existing and future mobile (cellular) and fixed line networks. An application of IVAS may be the provision of immersive voice and audio services over 3GPP fourth generation (4G) and fifth generation (5G) networks. In addition, the IVAS codec as an extension to EVS may be used in store and forward applications in which the audio and speech content is encoded and stored in a file for playback. It is to be appreciated that IVAS may be used in conjunction with other audio and speech coding technologies which have the functionality of coding the samples of audio and speech signals.

The metadata consists at least of spherical directions (elevation, azimuth), at least one energy ratio of a resulting direction, a spread coherence, and surround coherence independent of the direction, for each considered time-frequency (TF) block or tile, in other words a time/frequency sub band. In total IVAS may have a number of different types of metadata parameters for each time-frequency (TF) tile. The types of spatial audio parameters which can make up the metadata for IVAS are shown in Table 1 below.

This data may be encoded and transmitted (or stored) by the encoder in order to be able to reconstruct the spatial signal at the decoder.

Moreover, in some instances metadata assisted spatial audio (MASA) may support up to 2 directions for each TF tile which would require the above parameters to be encoded and transmitted for each direction on a per TF tile basis. Thereby potentially doubling the required bit rate according to Table 1.

| Field | Bits | Description |
|---|---|---|
| Direction index | 16 | Direction of arrival of the sound at a time-frequency parameter interval. Spherical representation at about 1-degree accuracy. Range of values: "covers all directions at about 1° accuracy" |
| Direct-to-total energy ratio | 8 | Energy ratio for the direction index (i.e., time-frequency subframe). Calculated as energy in direction/total energy. Range of values: [0.0, 1.0] |
| Spread coherence | 8 | Spread of energy for the direction index (i.e., time-frequency subframe). Defines the direction to be reproduced as a point source or coherently around the direction. Range of values: [0.0, 1.0] |
| Diffuse-to-total energy ratio | 8 | Energy ratio of non-directional sound over surrounding directions. Calculated as energy of non-directional sound/total energy. Range of values: [0.0, 1.0] (Parameter is independent of number of directions provided.) |
| Surround coherence | 8 | Coherence of the non-directional sound over the surrounding directions. Range of values: [0.0, 1.0] (Parameter is independent of number of directions provided.) |
| Remainder-to-total energy ratio | 8 | Energy ratio of the remainder (such as microphone noise) sound energy to fulfil requirement that sum of energy ratios is 1. Calculated as energy of remainder sound/total energy. Range of values: [0.0, 1.0] (Parameter is independent of number of directions provided.) |
| Distance | 8 | Distance of the sound originating from the direction index (i.e., time-frequency subframes) in meters on a logarithmic scale. Range of values: for example, 0 to 100 m. (Feature intended mainly for future extensions, e.g., 6DoF audio.) |

This data may be encoded and transmitted (or stored) by the encoder in order to be able to reconstruct the spatial signal at the decoder.

The bitrate allocated for metadata in a practical immersive audio communications codec may vary greatly. Typical overall operating bitrates of the codec may leave only 2 to 10 kbps for the transmission/storage of spatial metadata. However, some further implementations may allow up to 30 kbps or higher for the transmission/storage of spatial metadata. The encoding of the direction parameters and energy ratio components has been examined before along with the encoding of the coherence data. However, whatever the transmission/storage bit rate assigned for spatial metadata there will always be a need to use as few bits as possible to represent these parameters especially when a TF tile may support multiple directions corresponding to different sound sources in the spatial audio scene.

The concept as discussed hereafter is to encode the metadata spatial audio parameters for each TF tile by either merging spatial parameters across a number of frequency bands of a time subframe/frame and/or by merging the spatial parameters across a number of time sub frames/frames for a particular frequency band.

Accordingly, the invention proceeds from the consideration that the bit rate on a per TF tile basis may be reduced by merging the spatial audio parameters associated with each TF tile either across a number of frequency bands and/or a number of time sub frames/frames.

In this regard, FIG. 1 depicts an example apparatus and system for implementing embodiments of the application. The system 100 is shown with an 'analysis' part 121 and a 'synthesis' part 131. The 'analysis' part 121 is the part from receiving the multi-channel loudspeaker signals up to an encoding of the metadata and downmix signal and the 'synthesis' part 131 is the part from a decoding of the encoded metadata and downmix signal to the presentation of the re-generated signal (for example in multi-channel loudspeaker form).

The input to the system 100 and the 'analysis' part 121 is the multi-channel signals 102. In the following examples a microphone channel signal input is described, however any suitable input (or synthetic multi-channel) format may be implemented in other embodiments. For example, in some embodiments the spatial analyser and the spatial analysis may be implemented external to the encoder. For example, in some embodiments the spatial metadata associated with the audio signals may be provided to an encoder as a separate bit-stream. In some embodiments the spatial metadata may be provided as a set of spatial (direction) index values. These are examples of a metadata-based audio input format.

The multi-channel signals are passed to a transport signal generator 103 and to an analysis processor 105.

In some embodiments the transport signal generator 103 is configured to receive the multi-channel signals and generate a suitable transport signal comprising a determined number of channels and output the transport signals 104. For example, the transport signal generator 103 may be configured to generate a 2-audio channel downmix of the multi-channel signals. The determined number of channels may be any suitable number of channels. The transport signal generator in some embodiments is configured to otherwise select or combine, for example, by beamforming techniques the input audio signals to the determined number of channels and output these as transport signals.

In some embodiments the transport signal generator 103 is optional and the multi-channel signals are passed unprocessed to an encoder 107 in the same manner as the transport signal are in this example.

In some embodiments the analysis processor 105 is also configured to receive the multi-channel signals and analyse the signals to produce metadata 106 associated with the multi-channel signals and thus associated with the transport signals 104. The analysis processor 105 may be configured to generate the metadata which may comprise, for each time-frequency analysis interval, a direction parameter 108 and an energy ratio parameter 110 and a coherence parameter 112 (and in some embodiments a diffuseness parameter). The direction, energy ratio and coherence parameters may in some embodiments be considered to be spatial audio parameters. In other words, the spatial audio parameters comprise parameters which aim to characterize the sound-field created/captured by the multi-channel signals (or two or more audio signals in general).

In some embodiments the parameters generated may differ from frequency band to frequency band. Thus, for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. The transport signals 104 and the metadata 106 may be passed to an encoder 107.

The encoder 107 may comprise an audio encoder core 109 which is configured to receive the transport (for example downmix) signals 104 and generate a suitable encoding of these audio signals. The encoder 107 can in some embodiments be a computer (running suitable software stored on memory and on at least one processor), or alternatively a specific device utilizing, for example, FPGAs or ASICs. The encoding may be implemented using any suitable scheme. The encoder 107 may furthermore comprise a metadata encoder/quantizer 111 which is configured to receive the metadata and output an encoded or compressed form of the information. In some embodiments the encoder 107 may further interleave, multiplex to a single data stream or embed the metadata within encoded downmix signals before transmission or storage shown in FIG. 1 by the dashed line. The multiplexing may be implemented using any suitable scheme.

In the decoder side, the received or retrieved data (stream) may be received by a decoder/demultiplexer 133. The decoder/demultiplexer 133 may demultiplex the encoded streams and pass the audio encoded stream to a transport extractor 135 which is configured to decode the audio signals to obtain the transport signals. Similarly, the decoder/demultiplexer 133 may comprise a metadata extractor 137 which is configured to receive the encoded metadata and generate metadata. The decoder/demultiplexer 133 can in some embodiments be a computer (running suitable software stored on memory and on at least one processor), or alternatively a specific device utilizing, for example, FPGAs or ASICs.

The decoded metadata and transport audio signals may be passed to a synthesis processor 139.

The system 100 'synthesis' part 131 further shows a synthesis processor 139 configured to receive the transport and the metadata and re-creates in any suitable format a synthesized spatial audio in the form of multi-channel signals 110 (these may be multichannel loudspeaker format or in some embodiments any suitable output format such as binaural or Ambisonics signals, depending on the use case) based on the transport signals and the metadata.

Therefore, in summary first the system (analysis part) is configured to receive multi-channel audio signals.

Then the system (analysis part) is configured to generate a suitable transport audio signal (for example by selecting or downmixing some of the audio signal channels) and the spatial audio parameters as metadata.

The system is then configured to encode for storage/transmission the transport signal and the metadata.

After this the system may store/transmit the encoded transport and metadata.

The system may retrieve/receive the encoded transport and metadata.

Then the system is configured to extract the transport and metadata from encoded transport and metadata parameters, for example demultiplex and decode the encoded transport and metadata parameters.

The system (synthesis part) is configured to synthesize an output multi-channel audio signal based on extracted transport audio signals and metadata.

Figure 2:
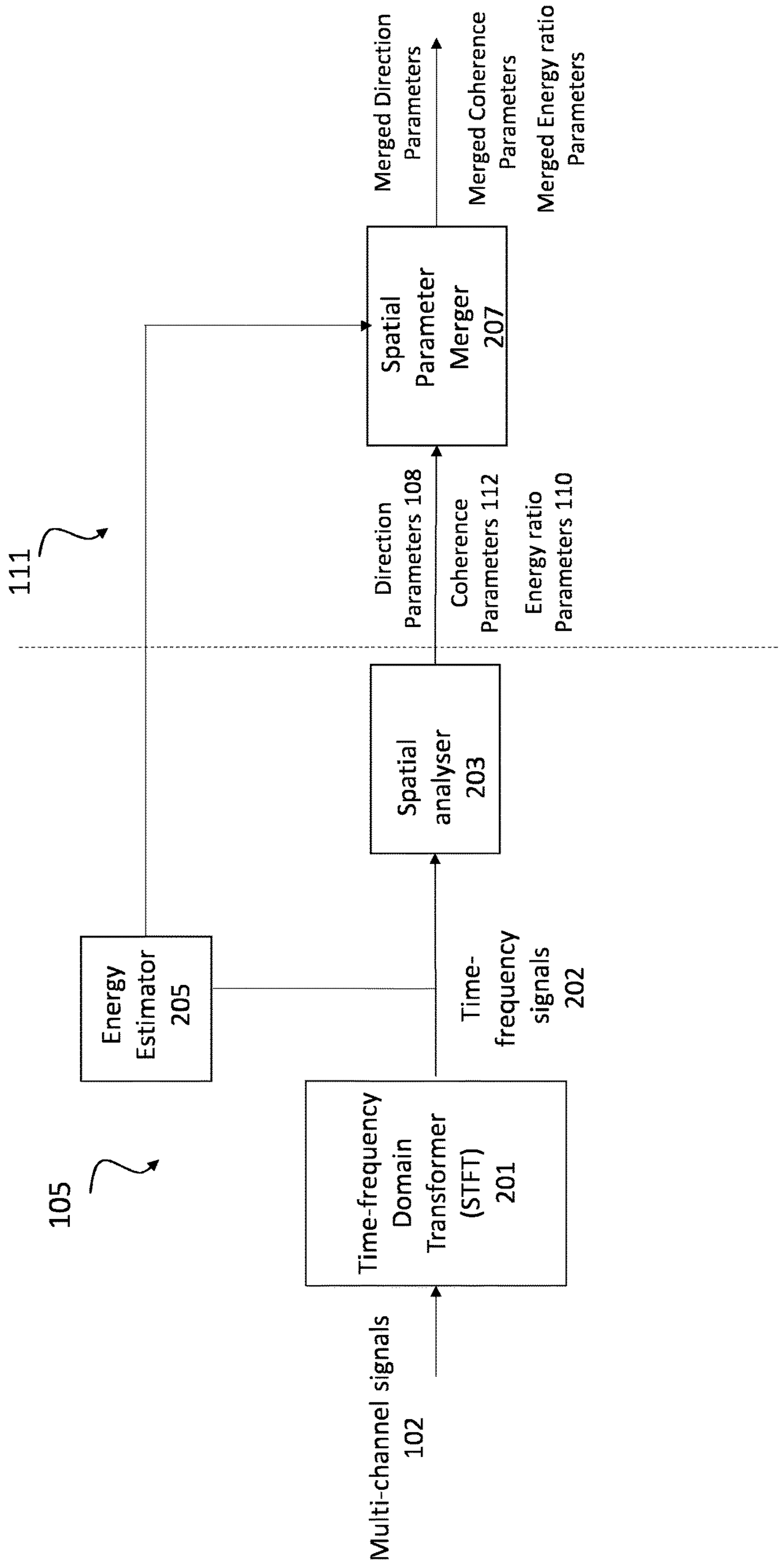
FIG. 2 shows schematically the metadata encoder according to some embodiments.

With respect to FIG. 2 an example analysis processor 105 and Metadata encoder/quantizer 111 (as shown in FIG. 1) according to some embodiments is described in further detail.

FIGS. 1 and 2 depict the Metadata encoder/quantizer 111 and the analysis processor 105 as being coupled together. However, it is to be appreciated that some embodiments may not so tightly couple these two respective processing entities such that the analysis processor 105 can exist on a different device from the Metadata encoder/quantizer 111. Consequently, a device comprising the Metadata encoder/quantizer 111 may be presented with the transport signals and metadata streams for processing and encoding independently from the process of capturing and analysing. In this case the energy estimator 205 may be configured to be part of the Metadata encoder/quantizer 111.

The analysis processor 105 in some embodiments comprises a time-frequency domain transformer 201.

In some embodiments the time-frequency domain transformer 201 is configured to receive the multi-channel signals 102 and apply a suitable time to frequency domain transform such as a Short Time Fourier Transform (STFT) in order to convert the input time domain signals into a suitable time-frequency signals. These time-frequency signals may be passed to a spatial analyser 203.

Thus for example, the time-frequency signals 202 may be represented in the time-frequency domain representation by $$s_i(b,n),$$

where b is the frequency bin index and n is the time-frequency block (frame) index and i is the channel index. In another expression, n can be considered as a time index with a lower sampling rate than that of the original time-domain signals. These frequency bins can be grouped into sub bands that group one or more of the bins into a sub band of a band index k=0, . . . , K−1. Each sub band k has a lowest bin $b_{k,low}$ and a highest bin $b_{k,high}$, and the subband contains all bins from $b_{k,low}$ to $b_{k,high}$ The widths of the sub bands can approximate any suitable distribution. For example, the Equivalent rectangular bandwidth (ERB) scale or the Bark scale.

A time frequency (TF) tile (or block) is thus a specific sub band within a subframe of the frame.

It can be appreciated that the number of bits required to represent the spatial audio parameters may be dependent at least in part on the TF (time-frequency) tile resolution (i.e., the number of TF subframes or tiles). For example, a 20 ms audio frame may be divided into 4 time-domain subframes of 5 ms a piece, and each time-domain subframe may have up to 24 frequency subbands divided in the frequency domain according to a Bark scale, an approximation of it, or any other suitable division. In this particular example the audio frame may be divided into 96 TF subframes/tiles, in other words 4 time-domain subframes with 24 frequency subbands. Therefore, the number of bits required to represent the spatial audio parameters for an audio frame can be dependent on the TF tile resolution. For example, if each TF tile were to be encoded according to the distribution of Table 1 above then each TF tile would require 64 bits (for one sound source direction per TF tile).

Embodiments aim to reduce the number of bits on a per frame basis by combining TF tiles on the time domain or the frequency domain Returning to FIG. 2, the time frequency signals 202 may be passed to an energy estimator 205 whereby the energy of each frequency sub band k may for all channels i of the time frequency signals 202 be determined. In embodiments this operation maybe expressed according to the following $$E(k, n) = \sum_i \sum_{b_{k,low}}^{b_{k,high}} |S(i, b, n)|^2$$

Where the time-frequency audio signals are denoted as S(i, b, n), i is the channel index, b is the frequency bin index, and n is the temporal sub-frame index, $b_{k,low}$ is the lowest bin of the band k and $b_{k,high}$ is the highest bin.

The energies of each sub band k within a time sub frame n may then be passed on to the spatial parameter merger 207.

In embodiments the analysis processor 105 may comprise a spatial analyser 203. The spatial analyser 203 may be configured to receive the time-frequency signals 202 and based on these signals estimate direction parameters 108. The direction parameters may be determined based on any audio based ‘direction’ determination.

For example, in some embodiments the spatial analyser 203 is configured to estimate the direction of a sound source with two or more signal inputs.

The spatial analyser 203 may thus be configured to provide at least one azimuth and elevation for each frequency band and temporal time-frequency block within a frame of an audio signal, denoted as azimuth $\phi$(k,n), and elevation $\theta$(k,n). The direction parameters 108 for the time sub frame may be also be passed to the spatial parameter merger 207.

The spatial analyser 203 may also be configured to determine an energy ratio parameter 110. The energy ratio may be considered to be a determination of the energy of the audio signal which can be considered to arrive from a direction. The direct-to-total energy ratio r(k,n) can be estimated, e.g., using a stability measure of the directional estimate, or using any correlation measure, or any other suitable method to obtain a ratio parameter. Each direct-to-total energy ratio corresponds to a specific spatial direction and describes how much of the energy comes from the specific spatial direction compared to the total energy. This value may also be represented for each time-frequency tile separately. The spatial direction parameters and direct-to-total energy ratio describe how much of the total energy for each time-frequency tile is coming from the specific direction. In general, a spatial direction parameter can also be thought of as the direction of arrival (DOA).

In embodiments the direct-to-total energy ratio parameter can be estimated based on the normalized cross-correlation parameter cor'(k,n) between a microphone pair at band k, the value of the cross-correlation parameter lies between −1 and 1. The direct-to-total energy ratio parameter r(k,n) can be determined by comparing the normalized cross-correlation parameter to a diffuse field normalized cross correlation parameter $cor'_D$(k,n) as $$r(k, n) = \frac{cor'(k, n) - cor'_D(k, n)}{1 - cor'_D(k, n)}.$$

The direct-to-total energy ratio is explained further in PCT publication WO2017/005978 which is incorporated herein by reference. The energy ratio may be passed to the spatial parameter merger 207.

The spatial analyser 203 may furthermore be configured to determine a number of coherence parameters 112 which may include surrounding coherence ($\gamma(k,n)$) and spread coherence ($\zeta(k,n)$), both analysed in time-frequency domain.

Each of the aforementioned coherence parameters are next discussed. All the processing is performed in the time-frequency domain, so the time-frequency indices k and n are dropped where necessary for brevity.

Let us first consider the situation where the sound is reproduced coherently using two spaced loudspeakers (e.g., front left and right) instead of a single loudspeaker. The coherence analyser may be configured to detect that such a method has been applied in surround mixing.

It is to be understood that the following sections explain the analysis of the spread and surround coherences in terms of a multichannel loudspeaker signal input. However, similar practices can be applied when the input comprises the microphone array as input.

In some embodiments therefore the spatial analyser 203 may be configured to calculate, the covariance matrix C for the given analysis interval consisting of one or more time indices n and frequency bins b. The size of the matrix is $N_L \times N_L$, and the entries are denoted as $c_{ij}$, where $N_L$ is the number of loudspeaker channels, and i and j are loudspeaker channel indices.

Next, the spatial analyser 203 may be configured to determine the loudspeaker channel $i_c$ closest to the estimated direction (which in this example is azimuth $\theta$).

$$i_c=\arg(\min|\theta-\alpha_i|)$$

where $\alpha_i$ is the angle of the loudspeaker i.

Furthermore, in such embodiments the spatial analyser 203 is configured to determine the loudspeakers closest on the left $i_l$ and the right $i_r$ side of the loudspeaker $i_c$.

A normalized coherence between loudspeakers i and j is denoted as $$c'_{ij} = \frac{|c_{ij}|}{\sqrt{|c_{ii}c_{jj}|}},$$

using this equation, the spatial analyser 203 may be configured to calculate a normalized coherence $c'_{lr}$ between $i_l$ and $i_r$. In other words, calculate $$c'_{lr} = \frac{|c_{lr}|}{\sqrt{|c_{ll}c_{rr}|}}.$$

Furthermore, the spatial analyser 203 may be configured to determine the energy of the loudspeaker channels i using the diagonal entries of the covariance matrix $$E_i=c_{ii},$$

and determine a ratio between the energies of the $i_l$ and $i_r$ loudspeakers and $i_l$, $i_r$, and $i_c$ loudspeakers as $$\xi_{lr/lrc} = \frac{E_l+E_r}{E_l+E_r+E_c}.$$

The spatial analyser 203 may then use these determined variables to generate a 'stereoness' parameter $$\mu=c'_{lr}\xi_{lr/lrc}.$$

This 'stereoness' parameter has a value between 0 and 1. A value of 1 means that there is coherent sound in loudspeakers $i_l$ and $i_r$ and this sound dominates the energy of this sector. The reason for this could, for example, be the loudspeaker mix used amplitude panning techniques for creating an "airy" perception of the sound. A value of 0 means that no such techniques has been applied, and, for example, the sound may simply be positioned to the closest loudspeaker.

Furthermore, the spatial analyser 203 may be configured to detect, or at least identify, the situation where the sound is reproduced coherently using three (or more) loudspeakers for creating a "close" perception (e.g., use front left, right and centre instead of only centre). This may be because a soundmixing engineer produces such a situation in surround mixing the multichannel loudspeaker mix.

In such embodiments the same loudspeakers $i_l$, $i_r$, and $i_c$ identified earlier are used by the coherence analyser to determine normalized coherence values $c'_{cl}$ and $c'_{cr}$ using the normalized coherence determination discussed earlier. In other words the following values are computed:

$$c'_{cl} = \frac{|c_{cl}|}{\sqrt{|c_{cc}c_{ll}|}},\ c'_{cr} = \frac{|c_{cr}|}{\sqrt{|c_{cc}c_{rr}|}}.$$

The spatial analyser 203 may then determine a normalized coherence value $c'_{clr}$ depicting the coherence among these loudspeakers using the following:

$$c'_{clr}=\min(c'_{cl},c'_{cr})$$

In addition, the spatial analyser 203 may be configured to determine a parameter that depicts how evenly the energy is distributed between the channels $i_l$, $i_r$, and $i_c$, $$\xi_{clr} = \min\left(\frac{E_l}{E_c}, \frac{E_c}{E_l}, \frac{E_r}{E_c}, \frac{E_c}{E_r}\right).$$

Using these variables, the spatial analyser 203 may determine a new coherent panning parameter $\kappa$ as, $$\kappa=c'_{clr}\xi_{clr}.$$

This coherent panning parameter $\kappa$ has values between 0 and 1. A value of 1 means that there is coherent sound in all loudspeakers $i_l$, $i_r$, and $i_c$, and the energy of this sound is evenly distributed among these loudspeakers. The reason for this could, for example, be because the loudspeaker mix was generated using studio mixing techniques for creating a perception of a sound source being closer. A value of 0 means that no such technique has been applied, and, for example, the sound may simply be positioned to the closest loudspeaker.

The spatial analyser 203 determined "stereoness" parameter $\mu$ which measures the amount of coherent sound in $i_l$ and $i_r$ (but not in $i_c$), and coherent panning parameter $\kappa$ which measures the amount of coherent sound in all $i_l$, $i_r$, and $i_c$ is configured to use these to determine coherence parameters to be output as metadata.

Thus, the spatial analyser 203 is configured to combine the "stereoness" parameter $\mu$ and coherent panning parameter $\kappa$ to form a spread coherence $\zeta$ parameter, which has values from 0 to 1. A spread coherence ζ value of 0 denotes a point source, in other words, the sound should be reproduced with as few loudspeakers as possible (e.g., using only the loudspeaker $i_c$). As the value of the spread coherence ζ increases, more energy is spread to the loudspeakers around the loudspeaker $i_c$; until at the value 0.5, the energy is evenly spread among the loudspeakers $i_l$, $i_r$, and $i_c$. As the value of spread coherence ζ increases over 0.5, the energy in the loudspeaker $i_c$ is decreased; until at the value 1, there is no energy in the loudspeaker $i_c$, and all the energy is at loudspeakers $i_l$ and $i_r$.

Using the aforementioned parameters μ and κ, the spatial analyser 203 is configured in some embodiments to determine a spread coherence parameter ζ, using the following expression:

$$\zeta = \begin{cases} \max(0.5, \mu - \kappa + 0.5), & \text{if } \max(\mu, \kappa) > 0.5 \ \& \ \kappa > \mu \\ \max(\mu, \kappa), & \text{else} \end{cases}.$$

The above expression is an example only and it should be noted that the spatial analyser 203 may estimate the spread coherence parameter ζ in any other way as long as it complies with the above definition of the parameter.

As well as being configured to detect the earlier situations the spatial analyser 203 may be configured to detect, or at least identify, the situation where the sound is reproduced coherently from all (or nearly all) loudspeakers for creating an “inside-the-head” or “above” perception.

In some embodiments spatial analyser 203 may be configured to sort, the energies $E_i$, and the loudspeaker channel $i_e$ with the largest value determined.

The spatial analyser 203 may then be configured to determine the normalized coherence $c'_{ij}$ between this channel and $M_L$ other loudest channels. These normalized coherence $c'_{ij}$ values between this channel and $M_L$ other loudest channels may then be monitored. In some embodiments $M_L$ may be $N_L-1$, which would mean monitoring the coherence between the loudest and all the other loudspeaker channels. However, in some embodiments $M_L$ may be a smaller number, e.g., $N_L-2$. Using these normalized coherence values, the coherence analyser may be configured to determine a surrounding coherence parameter γ using the following expression:

$$\gamma = \min_{M}(c'_{i_e j}),$$

where $c'_{i_e j}$ are the normalized coherences between the loudest channel and $M_L$ next loudest channels.

The surrounding coherence parameter γ has values from 0 to 1. A value of 1 means that there is coherence between all (or nearly all) loudspeaker channels. A value of 0 means that there is no coherence between all (or even nearly all) loudspeaker channels.

The above expression is only one example of an estimate for a surrounding coherence parameter γ, and any other way can be used, as long as it complies with the above definition of the parameter.

The spatial analyser 203 may be configured to output the determined coherence parameters spread coherence parameter ζ and surrounding coherence parameter γ to the spatial parameter merger 207.

Therefore, for each sub band k there will be collection of spatial audio parameters associated with the sub band. In this instance each sub band k may have the following spatial parameters associated with it; at least one azimuth and elevation denoted as azimuth ϕ(k,n), and elevation θ(k,n), surrounding coherence (γ(k,n)) and spread coherence (ζ(k, n)) and a direct-to-total-energy ratio parameter r(k,n).

In embodiments the spatial parameter merger 207 can be arranged to combine (or merge) a number of each of the aforementioned parameters into a fewer number of frequency bands. For instance, taking the example of a TF tile having 24 frequency bands i.e. k spans from 0 to 23. The spatial parameter values for each of the 24 frequency bands are merged into values associated with a fewer number of bands, where each of the fewer number of bands span a contiguous number of the original 24 bands.

Figure 3:
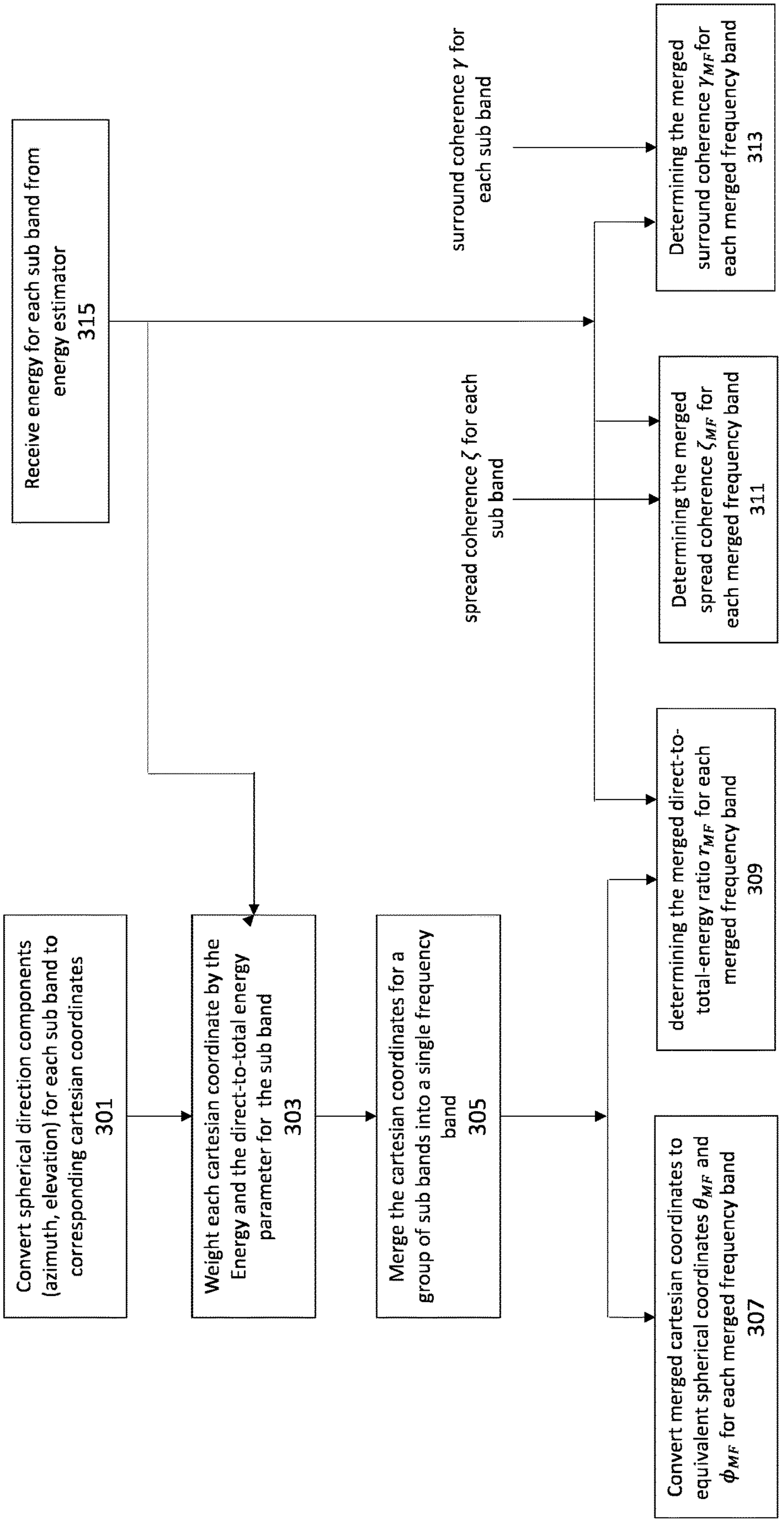
FIG. 3 shows a flow diagram of the operation of the metadata encoder as shown in FIG. 2 according to some embodiments.

In this respect FIG. 3 depicts some of the processing steps the spatial parameter merger 207 may be arranged to perform in some embodiments.

The spatial parameter merger 207 may perform the above merging by initially taking the azimuth ϕ(k,n) and elevation θ(k,n) spherical direction component for each of the K sub bands and converting each direction component to their respective cartesian coordinate vector. Each cartesian coordinate vector for the sub band k may then be weighted by the respective energy E(k,n) (from the energy estimator 205) and the direct-to-total energy ratio parameter r k,n) for the sub band k.

The conversion operation for an azimuth ϕ(k,n) and elevation direction θ(k,n) component of the sub band k to give the X axis direction component as $$x(k,n)=E(k,n)r(k,n)\cos\phi(k,n)\cos\theta(k,n) \quad (1)$$

the Y axis component as $$y(k,n)=E(k,n)r(k,n)\sin\phi(k,n)\cos\theta(k,n) \quad (2)$$

and the Z axis component as $$z(k,n)=E(k,n)r(k,n)\sin\theta(k,n) \quad (3)$$

The above operation may be performed for all sub bands k=0 to K−1.

The step of converting the spherical direction component for each sub band k of a sub frame n to their equivalent cartesian coordinate x, y, z is shown as the processing step 301 in FIG. 3

The step of weighting each cartesian coordinate x, y, z by the energy and direct-to-total energy parameter for the sub band k is shown as the processing step 303 in FIG. 3.

In this regards FIG. 3 also depicted the step of receiving the energy for each sub band from the energy estimator 205. This is shown as the processing step 315. The respective energy of each sub band is shown as being used in step 303.

The spatial parameter merger 207 may then be arranged to merge the above cartesian coordinates for a number of the sub bands 0 to K−1 into a single “merged” frequency band. This merging process may be repeated for a plurality of groupings of consecutive sub bands such that all sub bands 0 to K−1 have been merged into fewer merged frequency bands p=0 to P−1, where P<K.

For instance the merging process for the first merged frequency band p=0 may comprise a grouping of the cartesian coordinates for the first k1 (0 to k1−1) frequency bands of the sub bands 0 to K−1, the second merged frequency band p=1 may comprise a grouping of the cartesian coordinates for the second k1 (k1 to 2*k1−1) frequency bands of the sub bands 0 to K−1, the third merged frequency band p=2 may comprise a grouping of the cartesian coordinates for the third k1 (2*k1 to 3*k1−1) frequency bands of the sub bands 0 to K−1, and so on until a final merged frequency band p=P−1 comprises cartesian coordinates of the last sub bands of the K sub bands.

It is to be noted that the number of sub bands which are grouped may not necessary be fixed at k1, but instead can vary form one merged frequency band to another. In other words, the first merged frequency band p=0 may comprise the cartesian coordinates of the first k1 sub bands and the second merged frequency band p=1 may comprise the cartesian coordinates of the next following k2 sub bands, where k1 is not the same number as k2.

In embodiments the grouping (or merging) mechanism may comprise a summing step in which the cartesian coordinates are summed for the set of sub bands which are assigned to the particular merged frequency band.

Returning to the above example of a sub frame n having 24 sub bands. The spatial parameter merger 207 may be arranged to merge the cartesian coordinates of the 24 sub bands into 4 merged frequency bands, with each merged frequency band comprising the merged cartesian coordinates of 6 sub bands. In this example, the x cartesian coordinate merging process as performed by the spatial parameter merger 207 for maybe expressed for the first merged frequency band as $$x_{MF}(p=0,n)=\sum_{k=0}^{5}x(k,n)$$

The second merged frequency band in this example may be given as $$x_{MF}(p=1,n)=\sum_{k=6}^{11}x(k,n)$$

The third merged frequency band in this example may be given as $$x_{MF}(p=2,n)=\sum_{k=12}^{17}x(k,n)$$

The fourth merged frequency band in this example may be given as $$x_{MF}(p=3,n)=\sum_{k=18}^{23}x(k,n)$$

The above algorithmic steps may be repeated for the y and z cartesian coordinates to give $y_{MF}$(p,n) and $z_{MF}$(p,n) for p=0 to 3. Note that in the above expressions n is the time sub frame index. Generally, for a merged band p, the above example may be expressed as $$x_{MF}(p,n)=\sum_{k_{p,low}}^{k_{p,high}}x(k,n)$$

Where $k_{p,low}$ is the low frequency sub band of the merged frequency band p, and $k_{p,high}$ is the high frequency sub band of the merged frequency band p.

The step of merging sets of cartesian coordinates into a plurality of merged frequency bands, where each merged frequency band comprises the cartesian coordinates of a number of contiguous sub bands k is shown in FIG. 3 as processing step 305.

Once the cartesian coordinates x, y, z for sub bands k=0 to K−1 have been merged into the cartesian coordinates $x_{MF}$, $y_{MF}$ and $z_{MF}$ for the merged frequency bands p=0 to P−1 where P<K (according to the procedural steps outlined above,) the merged cartesian coordinates $x_{MF}$, $y_{MF}$ and $z_{MF}$ can be converted to their equivalent merged azimuth $\phi_{MF}$(p,n) and elevation spherical $\theta_{MF}$(p,n) direction components. In embodiments this conversion may be performed for each of the P merged cartesian coordinates $x_{MF}$, $y_{MF}$ and $z_{MF}$ by using the following expressions;

$$\phi_{MF}(p,n)=\operatorname{atan}\frac{y(p,n)}{x(p,n)}\text{ for }p=0\text{ to }P-1 \tag{4}$$

$$\theta_{MF}(p,n)=\operatorname{atan}\frac{z(p,n)}{\sqrt{x(p,n)^2+y(,n)^2}}\text{ for }0\text{ to }P-1 \tag{5}$$

where function atan is the arc tangent computational variant that automatically detects the correct quadrant for the angle.

The step of converting the merged cartesian coordinates to their equivalent merged spherical coordinates for each merged frequency band is shown as processing step 307 in FIG. 3.

Following on from above a corresponding merged direct-to-total-energy ratio $r_{MF}$(p,n) may be determined for each merged frequency band p by taking the length of the vector as formed from the above cartesian coordinates for merged frequency band p and normalising the length of the vector by the energy of the merged frequency band p. In embodiments the merged direct-to-total-energy ratio $r_{MF}$(p,n) for the merged frequency band p can be expressed as $$r_{MF}(p,n)=\frac{\sqrt{x_{MF}(p,n)^2+y_{MF}(p,n)^2+x_{MF}(p,n)^2}}{\sum_{k_{p.low}}^{k_{p.high}}E(k,n)}$$

Where as above $\Sigma_{k_{p,low}}^{k_{p,high}}E(k,n)$ is the energy of the signal contained in the original frequency bands $k_{p,low}$ to $k_{p,high}$ for the $p^{th}$ merged frequency band.

The step of determining the merged direct-to-total-energy ratio $r_{MF}$ for each merged frequency band (with input from processing step 315) is shown as processing step Additionally, some embodiments may derive a merged spread coherence for each merged frequency band p by using the spread coherence values ζ(k,n) calculated for each sub band k. The merged spread coherence $\zeta_{MF}$(p,n) for a merged frequency band p may be computed as an energy-weighted average of the spread coherence values of the frequency sub bands making up the merged frequency band p. In embodiments the merged spread coherence for a merged frequency band p may be expressed as $$\zeta_{MF}(p,n)=\frac{\sum_{k_{p.low}}^{k_{p.high}}\zeta(k,n)E(k,n)}{\sum_{k_{p.low}}^{k_{p.high}}E(k,n)}$$

The step of determining the merged spread coherence value $\zeta_{MF}$ for each merged frequency band is shown as processing step 311 (with input from processing step 315)

Similarly, some embodiments may derive a merged surround coherence for each merged frequency band p by using the surround coherence values γ(k,n) calculated for each sub band k. The merged spread coherence $\gamma_{MF}$(k,n) for a merged frequency band p may be computed as an energy-weighted average of the surround coherence values of the frequency sub bands making up the merged frequency band p. In embodiments the merged spread coherence for a merged frequency band p may be expressed as $$\gamma_{MF}(p, n) = \frac{\sum_{k_{p.low}}^{k_{p.high}} \gamma(k, n)E(k, n)}{\sum_{k_{p.low}}^{k_{p.high}} E(k, n)}$$

The step of determining the surround coherence value $\gamma_{MF}$ for each merged frequency band is shown as processing step 313 (with input from processing step 315).

In further embodiments the spatial parameter merger 207 may also be configured to combine spatial parameters such as the azimuth ϕ(k,n), and elevation θ(k,n), surrounding coherence (γ(k,n)) and spread coherence (ζ(k,n)) and a direct-to-total energy ratio parameter r(k,n) across a number of time sub frames n. For instance, a spatial parameter for a frequency band k may be combined (or merged) across a number of sub frames n 0 to N−1. In this case the spatial parameter values for a number of time sub frames may be merged into merged values associated with a fewer number of contiguous time sub frames.

In the corollary to step 305 the spatial parameter merger 207 may be arranged to merge azimuth ϕ(k,n), and elevation θ(k,n) elevation values across multiple contiguous groups of multiple sub frames n for a particular frequency sub band k. In a similar manner to that of step 301 the spatial parameter merger may convert the azimuth ϕ(k,n), and elevation θ(k,n) values for n=0 to N−1 subframes for a particular sub band k to their respective cartesian coordinate vector for the sub frame n. Each cartesian coordinate for the sub frame n may then be weighted by the respective energy E(k,n) (as generated by the energy estimator 205) and the direct-to-total energy parameter r(k,n) for the particular sub frame n.

The cartesian coordinates x(k,n), y(k,n) and z(k,n) may be determined by calculating equations (1) (2) and (3) for a sub band k over the time sub frame (or frame) of indices n=0 to N−1.

The spatial parameter merger 207 may then be arranged to merge the cartesian coordinates for a number of the sub frames into a single merged time frame q. In a manner similar to the frequency merging process embodiment described above this merging process may be repeated for a plurality of grouping of consecutive sub frames such that all sub frames 0 to N−1 have been merged into fewer merged frames of q=0 to Q−1, where Q<N.

For instance the merging process for the first merged time frame q=0 may comprise a grouping of the cartesian coordinates for the first n1 (0 to n1−1) time subframes of the subframes 0 to N−1, the second merged time frame q=1 may comprise a grouping of the cartesian coordinates for the second n1 (n1 to 2*n1−1) subframes of the subframes 0 to N−1, the third merged time frame q=2 may comprise a grouping of the cartesian coordinates for the third n1 (2*n1 to 3*n1−1) subframes of the subframes 0 to N−1, and so on until a final merged time frame q=Q−1 comprises cartesian coordinates of the last sub frames of the N subframes.

It is to be noted that the number of sub frames n which are merged may not necessary be fixed at n1, but instead can vary form one merged frame to another. In other words, the first merged frame q=0 may comprise the cartesian coordinates of the first n1 subframes and the second merged frame q=1 may comprise the cartesian coordinates of the next following n2 subframes, where n1 is not the same number as n2.

Similarly, in these embodiments the grouping mechanism may also comprise a summing step in which the cartesian coordinates of a particular merged time frame are summed for the set of sub frames which are assigned to the particular merged time frame.

Therefore, the x, y and z coordinates $x_{MT}$, $y_{MT}$, $z_{MT}$ of a merged time frame q may be expressed as $$x_{MT}(k, q) = \sum_{n_{q.low}}^{n_{q.high}} x(k, n)$$

$$y_{MT}(k, q) = \sum_{n_{q.low}}^{n_{q.high}} y(k, n)$$

$$z_{MT}(k, q) = \sum_{n_{q.low}}^{n_{q.high}} z(k, n)$$

Where $n_{q,low}$ is the low numbered subframe of the merged frame q, and $n_{q,high}$ is the higher numbered subframe of the merged frame q.

In the corollary to processing step 307 the time sub frame cartesian coordinates $x_{MT}$, $y_{MT}$ and $z_{MT}$ for the merged time frames q=0 to Q−1 where Q<N may also be converted their equivalent merged azimuth $\phi_{MT}$(k,q) and elevation $\theta_{MT}$(k,q) spherical direction components. In embodiments this conversion may be performed for each of the Q merged cartesian coordinates $x_{MT}$, $y_{MT}$ and $z_{MT}$ by using the following expressions;

$$\phi_{MT}(k, q) = a\tan\frac{y(k, q)}{x(k, q)} \text{ for } q = 0 \text{ to } Q-1 \tag{4}$$

$$\theta_{MT}(k, q) = a\tan\frac{z(k, q)}{\sqrt{x(k, q)^2 + y(k, q)^2}} \text{ for } q = 0 \text{ to } Q-1 \tag{5}$$

As before the function atan the arctangent computational variant that automatically detects the correct quadrant for the angle.

In a manner similar to the above embodiment in which the merging procedure is across the frequency sub bands the corresponding direct-to-total-energy ratio $r_{MT}$(k,q) for the merged time frame q may be given as $$r_{MT}(k, q) = \frac{\sqrt{x_{MT}(k, q)^2 + y_{MT}(k, q)^2 + x_{MT}(k, q)^2}}{\sum_{k_{q.low}}^{k_{q.high}} E(k, n)}$$

Where $\Sigma_{n_{q,low}}^{n_{q,high}}$ E(k n) is the energy of the signal contained in the original sub frames bands $n_{q,low}$ to $n_{q,high}$ for the $q^{th}$ merged sub frame for the sub band k.

Furthermore, the merged spread coherence for each merged time frame q for the sub band k can be derived by using the spread coherence values γ(k,n) calculated across the sub frames of the merged time frame q $$\zeta_{MT}(k, q) = \frac{\sum_{k_{q,low}}^{k_{q,high}} \zeta(k, n)E(k, n)}{\sum_{k_{q,low}}^{k_{q,high}} E(k, n)}$$

and similarly the merged surround coherence for each merged time frame a for the sub band k can be derived by using the surround coherence values γ(k,n) calculated across the sub frames of the merged time frame q.

$$\gamma_{MT}(k, q) = \frac{\sum_{k_{q,low}}^{k_{q,high}} \gamma(k, n)E(k, n)}{\sum_{k_{q,low}}^{k_{q,high}} E(k, n)}$$

The output from the spatial parameter merger 207 may then comprise the merged spatial audio parameters which may arranged to be passed to the metadata encoder/quantizer 111 for encoding and quantizing.

In some embodiments the merged spatial parameters may comprise the merged frequency band parameters $\theta_{MF}$, $\phi_{MF}$, $r_{MF}$, $\gamma_{MF}$, $\zeta_{MF}$ for each of the merged frequency bands on a per subframe basis.

In other embodiments the merged spatial parameters may comprise the merged time frame parameters $\theta_{MT}$, $\phi_{MT}$, $r_{MT}$, $\gamma_{MT}$, $\zeta_{MT}$ for each sub band k.

In further embodiments the spatial parameter merger 207 may be arranged such the merging process is performed in a cascaded manner whereby the spatial parameters can be first merged according to the above frequency band based merging process which is followed by the above time frame based merging process. Alternatively, the cascaded merging process as performed by the spatial parameter merger 207 may be reversed such that the above time frame based merging process is followed by the above frequency band based merging process.

In yet further embodiments the spatial parameter merger 207 may be arranged such that the merging process is performed such that the parameters can be merged according to the above frequency band based merging process together with the time frame based merging process. This can be performed using the above merging equations according to the limits of $n_{q,low}$ and $n_{q,high}$, $k_{p,low}$ and $k_{p,high}$.

In embodiments the spatial parameter merger 207 may have an additional functional element which provides an estimate (or measure) of the importance (in effect an importance estimator) of having the full number of spatial parameter sets (or directions) per TF tile as opposed to a reduced number of merged spatial parameter sets (and therefore a reduced number of directions on a per frame basis). Furthermore, the importance estimator may be used to determine whether particular sub bands and/or time sub frames should comprise merged or unmerged spatial audio parameters.

The importance estimate may be fed to a decision functional element within the spatial parameter merger 207 which decides whether the output (to be subsequently encoded) may comprise the spatial audio parameters for each TF tile or whether the output comprises merged spatial audio parameters, or indeed whether a particular group of sub-bands and/or sub frames in a time frame should have merged or unmerged spatial audio parameters.

Using the example above in which sets of spatial parameters are either merged across frequency bands and/or across sub frames in time. In light of this, the role of the importance estimator can be to estimate the importance to the perceived audio quality of using a set of spatial audio parameters (unmerged) for each TF tile as opposed to using a set of spatial audio parameters which have been merged across multiple frequency bands and/or multiple time sub frames.

To this end the importance measure may be estimated by comparing the length of the calculated merged cartesian coordinate vector (as derived above) to the sum of the vector lengths of the (unmerged) cartesian coordinates, summed over the merged sub bands and/or merged sub frames.

Returning to the frequency band based merging example above, the sum of the vector lengths of the (unmerged) cartesian coordinates, summed over the sub bands which were merged into the frequency band p can be expressed as $$\Xi_{MF}(p, n) = \sum_{k_{p,low}}^{k_{p,high}} \sqrt{x(k, n)^2 + y(k, n)^2 + z(k, n)^2}.$$

The length of the calculated merged cartesian coordinate vector for the merged frequency band p can be written as $$\sqrt{x_{MF}(p,n)^2 + y_{MF}(p,n)^2 + z_{MF}(p,n)^2}$$

The importance estimate (or measure) λ(p,n) for the pth merged frequency band can then be expressed as $$\lambda(p, n) = \left(\sum_{n_{p,low}}^{n_{p,high}} \sqrt{x(k, n)^2 + y(k, n)^2 + z(k, n)^2}\right) - \sqrt{x_{MF}(p, n)^2 + y_{MF}(p, n)^2 + z_{MF}(p, n)^2}$$

In this case the selection as to whether to encode and transmit merged or unmerged spatial audio parameter sets can be based on a comparison as to whether the importance measure λ(p,n) exceeds a threshold value $\lambda_{th}$.

Such that if $\lambda(p,n) > \lambda_{th}$ the decision may be made to encode and transmit unmerged spatial audio parameters as metadata.

If $\lambda(p,n) < \lambda_{th}$ the decision may be made to encode and transmit the merged spatial audio parameters as metadata.

In the case of a decision to transmit unmerged spatial audio parameters as the metadata, the spatial parameter merger 207 may be configured to output the original sets of spatial audio parameters. For example, should the above comparison indicate that it would be advantageous to output the unmerged spatial audio parameters rather than merged spatial audio parameters for the pth merged frequency band, then the following spatial audio parameters ϕ(k,n), θ(k,n), (γ(k,n)), (ζ(k,n)) and r(k,n) for the sub bands $k_{p,low}$ to $k_{p,high}$ may form the output for the pth merged frequency band.

In the case of a decision to transmit merged spatial audio parameters as the metadata, in other words a set of spatial audio parameters for a merged set of sub bands and/or a merged set subframes, the spatial parameter merger 207 may be configured to output the merged spatial audio parameter, and in the case of the merged frequency band p the output parameters may comprise the set $\theta_{MF}$, $\phi_{MF}$, $r_{MF}$, $\gamma_{MF}$, $\zeta_{MF}$.

In other embodiments an average importance value may be determined for a number of sub frames and/or sub bands.

This may be achieved by taking the mean of the importance measure over a group of importance measures. Such as $$\lambda_{avg}(k, m) = \frac{\sum_{n=1}^{N} \lambda(k, n)}{N}$$

Where N in this instance is the number of sub frames in a frame m, however the average could be taken over a number of sub bands instead, or in other embodiments the average can be taken for the importance measures across a combination of frequency bands and time frames. Using an average value for the importance measure has the advantage of only requiring a signalling bit for a group of merged frames and/or frequency band rather than a signalling bit for every merged time frame and/or frequency band.

It is to be appreciated that in the above circumstances a signalling bit may need to be included in the metadata in order to indicate whether the spatial audio parameters are merged or unmerged.

The importance measure may have the characteristic such that when all the directions (over the merged sub frames and/or sub bands) point in approximately the same direction, the importance measure will tend to have a low value (approaching the value of zero). In contrast however, if the directions all tend to point in opposite directions and that the direct-to-total energy ratios associated with each of the directions are approximately the same, then the importance measure may tend to have the value of 1. A further characteristics exhibited by the importance measure may be such that if one of the subbands/subframes has significantly higher direct-to-total energy ratio than any of the others then the importance measure will also tend to have a low value.

In embodiments the value chosen as the threshold $\lambda_{th}$ can be fixed, and experimentation has found a value of 0.3 was found to give an advantageous result.

In other embodiments the importance threshold $\lambda_{th}$ may be determined for a frame by sorting the a number of importance measures λ(k,n) for a number of merged sub bands and/or sub frames in an ascending order and determining the threshold as the value of the importance measure which gives a specific number of importance measures (and therefore merged sub bands and/or sub frames) above the threshold, for example the threshold measure may be selected on the basis that there is an l number of merged subframes and or sub bands in the frame whose importance measure is above the selected threshold.

In further embodiments the importance threshold $\lambda_{th}$ may be adaptive to a running median value of importance measures over the last N temporal sub frames (for example the last 20 sub frames). Such that $\lambda_{med}(n)$ may denotes the median value for the subframe n of the importance measures over the last N subframes over all frequency bands. The importance threshold $\lambda_{th}(n)$ for the subframe n may then be expressed as $\lambda_{th}(n)=c_{th}\lambda_{med}(n)$ where $c_{th}$ is a coefficient controlling the value of the importance threshold, for example $c_{th}$ may be assigned the value 0.5.

Additionally, some embodiments may not deploy a threshold value. In these embodiments a number of the most important TF tiles in the frame/sub frame may be arranged to use un-combined directions, and the remaining number of TF tiles in the frame/sub frame are arranged to use combined directions.

The metadata encoder/quantizer 111 may comprise a direction encoder. The direction encoder 205 is configured to receive the merged direction parameters (such as the azimuth $\phi_{MF}$ or $\phi_{MT}$ and elevation $\theta_{MF}$, or $\theta_{MT}$) (and in some embodiments an expected bit allocation) and from this generate a suitable encoded output. In some embodiments the encoding is based on an arrangement of spheres forming a spherical grid arranged in rings on a 'surface' sphere which are defined by a look up table defined by the determined quantization resolution. In other words, the spherical grid uses the idea of covering a sphere with smaller spheres and considering the centres of the smaller spheres as points defining a grid of almost equidistant directions. The smaller spheres therefore define cones or solid angles about the centre point which can be indexed according to any suitable indexing algorithm. Although spherical quantization is described here any suitable quantization, linear or non-linear may be used.

The metadata encoder/quantizer 111 may comprise an energy ratio encoder. The energy ratio encoder may be configured to receive the merged energy ratios $r_{MF}$ or $r_{MT}$ and determine a suitable encoding for compressing the energy ratios for the merged sub-bands and/or merged time-frequency blocks.

Similarly, the metadata encoder/quantizer 111 may also comprise a coherence encoder which is configured to receive the merged surround coherence values $\gamma_{MF}$ or $\gamma_{MT}$ and spread coherence values $\zeta_{MF}$ or $\zeta_{MT}$ and determine a suitable encoding for compressing the surround and spread coherence values for the merged sub-bands and/or merged time-frequency blocks.

The encoded merged direction, energy ratios and coherence values may be passed to the combiner 211. The combiner is configured to receive the encoded (or quantized/compressed) merged directional parameters, energy ratio parameters and coherence parameters and combine these to generate a suitable output (for example a metadata bit stream which may be combined with the transport signal or be separately transmitted or stored from the transport signal).

In some embodiments the encoded datastream is passed to the decoder/demultiplexer 133. The decoder/demultiplexer 133 demultiplexes the encoded merged direction indices, merged energy ratio indices and merged coherence indices and passes them to the metadata extractor 137 and also the decoder/demultiplexer 133 may in some embodiments extract the transport audio signals to the transport extractor for decoding and extracting.

In embodiments the decoder/demultiplexer 133 may be arranged to receive and decode the signalling bit indicating either the received encoded spatial audio parameters are encoded merged spatial audio parameters for a group of merged sub bands and/or sub frames or the received encoded spatial audio parameters are a number of sets of encoded spatial audio parameters, each set corresponding to a sub band or a sub frame.

The merged energy ratio indices, direction indices and coherence indices may be decoded by their respective decoders to generate the merged energy ratios, directions and coherences for the sub frame when the merging is over the frequency bands of the sub frame or for a particular sub band when the merging is over consecutive time sub frames. This can be performed by applying the inverse of the various encoding processes employed at the encoder.

In the case of the signalling bit indicating that the spatial audio parameters are not merged, the sets of received spatial audio parameters may be passed directly to the various decoders for decoding.

The merged spatial parameters may be passed to a spatial parameter expander (which in some embodiments may form part of the metadata extractor 137) which is configured to expand the merged spatial parameters such that the temporal and frequency resolutions of the original spatial parameters is reproduced at the decoder for subsequent processing and synthesis.

In the case of the merged spatial parameters being composed of the merged frequency band parameters $\theta_{MF}$, $\phi_{MF}$, $\Delta_{MF}$, $\zeta_{MF}$ the expanding process may comprise replicating the merged spatial parameters across the original frequency bands k over which the spatial parameters were merged.

For example, in the case of the merged elevation component $\theta_{MF}(p,n)$ the expanding process can comprise simply replicating the value $\theta_{MF}(p,n)$ over the original frequency sub bands $k_{p,low}$ to $k_{p,high}$ for the $p^{th}$ merged frequency band.

In other words, in relation to a pth merged frequency band, the expanded spatial values θ(k,n) associated with the sub bands which span the pth merged frequency band can be expressed as $$\theta(k,n) \text{ for } k_{p,low} \text{ to } k_{p,high}=\theta_{MF}(p,n)$$

Obviously, this may be repeated for each merged frequency band p=0 to P−1, to provide a value for all sub bands k=0 to K−1.

This above expansion process can be performed for all the merged frequency band parameters $\theta_{MF}$, $\phi_{MF}$, $\gamma_{MF}$, $\zeta_{MF}$ in order to provide the spatial parameters θ(k,n), ϕ(k,n), γ(k,n), ζ(k,n) for each sub band k=0 to K−1.

In the case of the merged spatial parameters being composed of the merged time frame parameters $\theta_{MT}$, $\phi_{MT}$, $\gamma_{MT}$, $\zeta_{MT}$, the expanding process may comprise replicating the merged spatial parameters across the original sub frames n over which the spatial parameters were merged. So that, in the case of the merged elevation component $\theta_{MT}(k,q)$ the expanding process can comprise simply replicating the value $\theta_{MT}(k,q)$ over the original sub frames $n_{q,low}$ to $n_{q,high}$ for the $q^{th}$ merged time frame.

In other words, in relation to a qth merged time frame, the expanded spatial values θ(k,n) associated with the sub frames which span the qth merged time frame can be expressed as $$\theta(k,n) \text{ for } n_{q,low} \text{ to } n_{q,high}=\theta_{MF}(k,q)$$

Obviously, this may be repeated for each merged time frame q=0 to Q−1, to provide a value for all sub frames n=0 to N−1.

In the corollary, the above expansion process can be performed for all the merged time frame parameters $\theta_{MT}$, $\phi_{MT}$, $\gamma_{MT}$, $\zeta_{MT}$ in order to provide the spatial parameters θ(k,n), ϕ(k,n), γ(k,n), ζ(k,n) for each sub frame n=0 to N−1 (for a particular band k).

The decoded and expanded spatial parameters may then form the decoded metadata output from the metadata extractor 137 and passed to the synthesis processor 139 in order to form the multi-channel signals 110.

Figure 4:
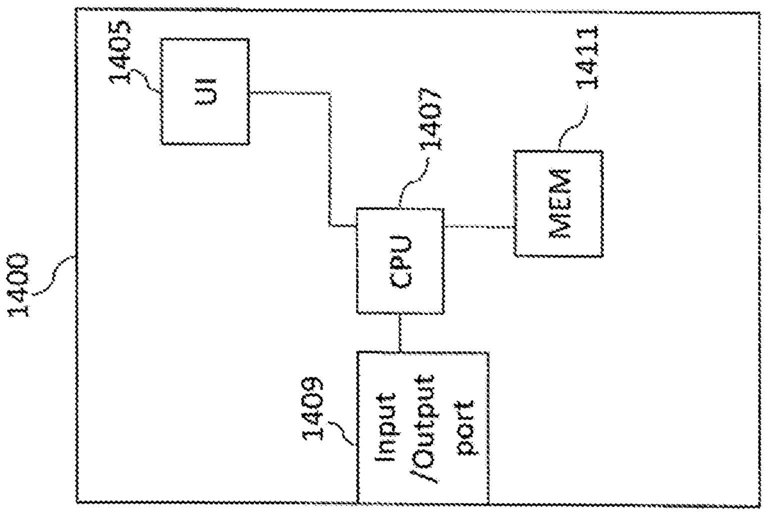
FIG. 4 shows schematically an example device suitable for implementing the apparatus shown.

With respect to FIG. 4 an example electronic device which may be used as the analysis or synthesis device is shown. The device may be any suitable electronics device or apparatus. For example, in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore, in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore, the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein, and generate a suitable audio signal format output by using the processor 1407 executing suitable code. The input/output port 1409 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs can route conductors and locate components on a semiconductor chip using well established rules of design as well as libraries of pre-stored design modules. Once the design for a semiconductor circuit has been completed, the resultant design, in a standardized electronic format may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims.

However, all such and similar modifications of the teachings of this invention will still fall within the scope of this invention as defined in the appended claims.

The invention claimed is:

1. An apparatus comprising at least one processor and at least one memory including computer program code, the at least one memory and the computer program code configured to, with the at least one processor, cause the apparatus to:

determine or receive at least two of a type of spatial audio parameter for one or more audio signals, wherein a first of the type of spatial audio parameter is associated with a first group of samples in a domain of the one or more audio signals and a second of the type of spatial audio parameter is associated with a second group of samples in the domain of the one or more audio signals;

merge the first of the type of spatial audio parameter and the second of the type of spatial audio parameter into a merged spatial audio parameter; and at least one of store or transmit an encoded representation of at least one of the first of the type of spatial audio parameter, the second of the type of spatial audio parameter or the merged spatial audio parameter.

2. The apparatus as claimed in claim 1, wherein the apparatus is further caused to:

determine whether the merged spatial audio parameter is encoded for at least one of storage or transmission; or determine whether the at least two of the type of spatial audio parameter is encoded for at least one of storage or transmission.

3. The apparatus as claimed in claim 2, wherein the apparatus is further caused to:

determine a metric for the first group of samples and the second group of samples; and compare the metric against a threshold value;

wherein when the metric is above the threshold value the apparatus is caused to determine that the at least two of the type of spatial audio parameter is encoded for at least one storage or transmission; and wherein when the metric is below or equal to the threshold value the apparatus is caused to determine that the merged spatial audio parameter band is encoded for at least one of storage or transmission.

4. The apparatus as claimed in claim 1, wherein the apparatus is further caused to:

determine a metric for the first group of samples and the second group of samples;

determine a further at least two of a type of spatial audio parameter for the one or more audio signals, wherein a further first of the type of spatial audio parameter is associated with a first further group of samples in the domain of the one or more audio signals and a further second of the type of spatial audio parameter is associated with a second further group of samples in the domain of the one or more audio signals;

merge the further first of the type of spatial audio parameter and the further second of the type of spatial audio parameter into a further merged spatial audio parameter;

determine a metric for the first further group of samples and second further group of samples; and determine that the further first of the type of spatial audio parameter and the further second of the type of spatial audio parameter are encoded for at least one of storage or transmission and the merged spatial audio parameter is encoded for at least one of storage or transmission when the metric for the first further group of samples and second further group of samples is higher than the metric for the first group of samples and the second group of samples.

5. The apparatus as claimed in claim 1, wherein the apparatus is further caused to determine an energy of the first group of samples of the one or more audio signals and an energy of the second group of samples of the one or more audio signals, wherein the value of the merged spatial audio parameter is based on the energy of the first group of samples and the energy of the second group of samples.

6. The apparatus as claimed in claim 5, wherein the type of spatial audio parameter comprises a spherical direction vector and wherein the merged spatial audio parameter comprises a merged spherical direction vector, and wherein to merge the first of the type of spatial audio parameter and the second of the type of spatial audio parameter into the merged spatial audio parameter, the apparatus is caused to:

convert a first spherical direction vector into a first cartesian vector converting a second spherical direction vector into a second cartesian vector, wherein the first cartesian direction vector and second cartesian direction vector each comprise an x-axis component, y-axis component and a z-axis component, and wherein for each component the apparatus is caused to;

weight the component of the first cartesian vector by the energy of the first group of samples of the one or more audio signals and a direct to total energy ratio calculated for the first group of samples of the one or more audio signals;

weight the component of the second cartesian vector by the energy of the second group of samples of the one or more audio signals and a direct to total energy ratio calculated for the second group of samples of the one or more audio signals;

sum, the weighted component of the first cartesian vector and the weighted respective component of the second cartesian vector to give a merged respective cartesian component vector; and convert the merged cartesian x-axis component value, the merged cartesian y-axis component value and the merged cartesian z-axis component value into the merged spherical direction vector.

7. The apparatus as claimed in claim 6, wherein the apparatus is further caused to merge the direct to total energy ratio for the first group of samples of the one or more audio signals and the direct to total energy ratio of the second group of samples of the one or more audio signals into a merged direct to total energy ratio, by being caused to determine the length of the merged cartesian vector; and normalize the length of the merged cartesian vector by the sum of the energy of the first group of samples of the one or more audio signals and the energy of the second group of the one or more audio signals.

8. The apparatus as claimed in claim 6, wherein the apparatus caused to determine a metric, is caused to:

determine a sum of the length of the first cartesian vector and the length of the second cartesian vector; and determine a difference between the length of the merged cartesian vector and the sum.

9. The apparatus as claimed in claim 5, wherein the apparatus is further caused to:

determine a first spread coherence parameter associated with the first group of samples in the domain of the one or more audio signals and a second spread coherence parameter associated with the second group of samples in the domain of the one or more audio signals; and merge the first spread coherence parameter and the second spread coherence parameter into a merged spread coherence parameter, and wherein to merge the first spread coherence parameter and the second spread coherence parameter into a merged spread coherence parameter, the apparatus is caused to:

weight a first spread coherence value by the energy of the first group of samples of the one or more audio signals;

weight a second spread coherence value by the energy of the second group of samples of the one or more audio;

sum the weighted first spread coherence value and the weighted second spread coherence value to give a merged spread coherence value; and normalise the merged spread coherence value by the sum of the energy of the first group of samples of the one or more audio signals and the energy of the second group of the one or more audio signals.

10. The apparatus as claimed in claim 5, wherein the apparatus is further caused to:

determine a first surround coherence parameter associated with the first group of samples in the domain of the one or more audio signals and a second surround coherence parameter associated with the second group of samples in the domain of the one or more audio signals; and merge the first surround coherence parameter and the second surround coherence parameter into a merged surround coherence parameter, and wherein to merge the first surround coherence parameter and the second surround coherence parameter into a merged surround coherence parameter, the apparatus is caused to:

weight the first surround coherence value by the energy of the first group of samples of the one or more audio signals;

weight the second surround coherence value by the energy of the second group of samples of the one or more audio;

sum, the weighted first surround coherence value and the weighted second surround coherence value to give the merged spread coherence value; and normalise the merged surround coherence value by the sum of the energy of the first group of samples of the one or more audio signals and the energy of the second group of the one or more audio signals.

11. The apparatus as claimed in claim 1, wherein the apparatus is further caused to:

determine a first spread coherence parameter associated with the first group of samples in the domain of the one or more audio signals and a second spread coherence parameter associated with the second group of samples in the domain of the one or more audio signals; and merge the first spread coherence parameter and the second spread coherence parameter into a merged spread coherence parameter.

12. The apparatus as claimed in claim 1, wherein the apparatus is further caused to:

determine a first surround coherence parameter associated with the first group of samples in the domain of the one or more audio signals and a second surround coherence parameter associated with the second group of samples in the domain of the one or more audio signals; and merge the first surround coherence parameter and the second surround coherence parameter into a merged surround coherence parameter.

13. The apparatus as claimed in claim 1, wherein the first group of samples is a first subframe in the time domain and the second group of samples is a second subframe in the time domain.

14. The apparatus as claimed in claim 1, wherein the first group of samples is a first sub band in the frequency domain and the second group of samples is a second sub band in the frequency domain.

15. A method comprising:

determining or receiving at least two of a type of spatial audio parameter for one or more audio signals, wherein a first of the type of spatial audio parameter is associated with a first group of samples in a domain of the one or more audio signals and a second of the type of spatial audio parameter is associated with a second group of samples in the domain of the one or more audio signals;

merging the first of the type of spatial audio parameter and the second of the type of spatial audio parameter into a merged spatial audio parameter; and at least one of storing or transmitting an encoded representation of at least one of the first of the type of spatial audio parameter, the second of the type of spatial audio parameter or the merged spatial audio parameter.

16. The method as claimed in claim 15, wherein the method further comprises:

determining whether the merged spatial audio parameter is encoded for at least one of storage or transmission; or determining whether the at least two of the type of spatial audio parameter is encoded for at least one of storage or transmission.

17. The method as claimed in claim 16, wherein the method further comprises:

determining a metric for the first group of samples and the second group of samples; and comparing the metric against a threshold value, wherein when the metric is above the threshold value the method comprises determining that the at least two of the type of spatial audio parameter is encoded for at least one of storage or transmission; and wherein when the metric is below or equal to the threshold value then determining that the merged spatial audio parameter band is encoded for at least one of storage or transmission.

18. The method as claimed in claim 15, wherein the method further comprises:

determining a metric for the first group of samples and the second group of samples;

determining a further at least two of a type of spatial audio parameter for the one or more audio signals, wherein a further first of the type of spatial audio parameter is associated with a first further group of samples in the domain of the one or more audio signals and a further second of the type of spatial audio parameter is associated with a second further group of samples in the domain of the one or more audio signals;

merging the further first of the type of spatial audio parameter and the further second of the type of spatial audio parameter into a further merged spatial audio parameter;

determining a metric for the first further group of samples and second further group of samples; and determining that the further first of the type of spatial audio parameter and the further second of the type of spatial audio parameter are encoded for at least one of storage or transmission and the merged spatial audio parameter is encoded for at least one of storage or transmission when the metric for the first further group of samples and second further group of samples is higher than the metric for the first group of samples and the second group of samples.

19. The method as claimed in claim 15, wherein the method further comprises determining an energy of the first group of samples of the one or more audio signals and an energy of the second group of samples of the one or more audio signals, wherein the value of the merged spatial audio parameter is based on the energy of the first group of samples and the energy of the second group of samples.

20. The method as claimed in claim 19, wherein the type of spatial audio parameter comprises a spherical direction vector and wherein the merged spatial audio parameter comprises a merged spherical direction vector, and wherein merging the first of the type of spatial audio parameter and the second of the type of spatial audio parameter into the merged spatial audio parameter comprises:

converting a first spherical direction vector into a first cartesian vector converting a second spherical direction vector into a second cartesian vector, wherein the first cartesian direction vector and second cartesian direction vector each comprise an x-axis component, y-axis component and a z-axis component, and wherein for each component in turn the method comprises:

weighting the component of the first cartesian vector by the energy of the first group of samples of the one or more audio signals and a direct to total energy ratio calculated for the first group of samples of the one or more audio signals;

weighting the component of the second cartesian vector by the energy of the second group of samples of the one or more audio signals and a direct to total energy ratio calculated for the second group of samples of the one or more audio signals;

summing, the weighted component of the first cartesian vector and the weighted respective component of the second cartesian vector to give a merged respective cartesian component vector; and converting the merged cartesian x-axis component value, the merged cartesian y-axis component value and the merged cartesian z-axis component value into the merged spherical direction vector.

* * * * *